US010229555B2

(12) United States Patent
Ohtani

(10) Patent No.: US 10,229,555 B2
(45) Date of Patent: *Mar. 12, 2019

(54) CARD GAME MACHINE

(71) Applicant: Semiconductor Energy Laboratory Co., Ltd., Atsugi-shi, Kanagawa-ken (JP)

(72) Inventor: Hisashi Ohtani, Tochigi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/961,109

(22) Filed: Apr. 24, 2018

(65) Prior Publication Data

US 2018/0240300 A1 Aug. 23, 2018

Related U.S. Application Data

(63) Continuation of application No. 14/146,154, filed on Jan. 2, 2014, now abandoned, which is a continuation (Continued)

(30) Foreign Application Priority Data

May 29, 2007 (JP) ................................ 2007-142370

(51) Int. Cl.

*A63F 9/24* (2006.01)
*A63F 13/00* (2014.01)

(Continued)

(52) U.S. Cl.

CPC .......... *G07F 17/3241* (2013.01); *G07F 17/32* (2013.01); *G07F 17/3202* (2013.01); *G07F 17/3293* (2013.01)

(58) Field of Classification Search

CPC ...... A63F 2009/2489; A63F 2009/2411; A63F 2009/2429; A63F 1/067; A63F 2003/00164

See application file for complete search history.

(56) References Cited

U.S. PATENT DOCUMENTS 5,769,415 A 6/1998 Yamazaki et al.
6,784,842 B2 8/2004 Vesuna (Continued)

FOREIGN PATENT DOCUMENTS

JP 11-244537 A 9/1999
JP 2002-239207 A 8/2002

(Continued)

*Primary Examiner* — Milap Shah
*Assistant Examiner* — Jason Pinheiro
(74) *Attorney, Agent, or Firm* — Robinson Intellectual Property Law Office; Eric J. Robinson

(57) ABSTRACT

An object is to provide a card game machine capable of enhancing gameplay. A card game machine has a game board including a plurality of reader/writers configured to communicate with a semiconductor device which is mounted on a card and capable of wireless communication, and a control device connected to the reader/writer and configured to determine the position or orientation of the card or whether the card is put face up or down based on a signal from the reader/writer. By arrangement of a plurality of reader/writers and RF chips in the game board, not only data of the card but also signal strength can be detected, and the detailed position of an RF chip of the card which is placed on the game board can be specified.

17 Claims, 12 Drawing Sheets

Related U.S. Application Data of application No. 12/153,645, filed on May 22, 2008, now Pat. No. 8,632,391.

(51) Int. Cl.

| | |
|---|---|
| ***G06F 17/00*** | (2006.01) |
| ***G06F 19/00*** | (2018.01) |
| ***G07F 17/32*** | (2006.01) |

(56) References Cited

U.S. PATENT DOCUMENTS

| | | | | |
|---|---|---|---|---|
| 7,119,738 | B2 | 10/2006 | Bridgelall et al. | |
| 7,170,412 | B2 | 1/2007 | Knox et al. | |
| 7,284,703 | B2 | 10/2007 | Powell et al. | |
| 7,786,936 | B2 | 8/2010 | Kurokawa | |
| 7,883,408 | B2 | 2/2011 | Gelinotte | |
| 2002/0052238 | A1 | 5/2002 | Muroi | |
| 2005/0026680 | A1* | 2/2005 | Gururajan | A63F 1/14 463/25 |
| 2005/0026682 | A1* | 2/2005 | Grauzer | A63F 1/00 463/29 |
| 2005/0054408 | A1* | 3/2005 | Steil | A63F 1/18 463/11 |
| 2005/0164761 | A1 | 7/2005 | Tain | |
| 2006/0009271 | A1 | 1/2006 | Kamada et al. | |
| 2006/0160628 | A1 | 7/2006 | Abe | |
| 2006/0205508 | A1 | 9/2006 | Green | |
| 2006/0208422 | A1 | 9/2006 | Stapleton | |
| 2006/0246981 | A1 | 11/2006 | Walker et al. | |
| 2006/0252521 | A1* | 11/2006 | Gururajan | A63F 1/00 463/29 |
| 2006/0252550 | A1 | 11/2006 | Okada | |
| 2007/0052167 | A1 | 3/2007 | Galatan | |
| 2007/0060311 | A1* | 3/2007 | Rowe | A44C 21/00 463/25 |
| 2007/0073513 | A1 | 3/2007 | Posamentier | |
| 2007/0087834 | A1* | 4/2007 | Moser | G06Q 30/02 463/42 |
| 2007/0194931 | A1* | 8/2007 | Miller | A63F 1/06 340/572.7 |
| 2007/0252208 | A1 | 11/2007 | Koyama et al. | |
| 2007/0273522 | A1 | 11/2007 | Dembo et al. | |
| 2007/0298885 | A1* | 12/2007 | Tran | A63F 13/06 463/37 |
| 2008/0009339 | A1* | 1/2008 | Pat | A63F 1/06 463/25 |
| 2008/0113772 | A1* | 5/2008 | Burrill | G07F 17/32 463/25 |
| 2008/0165023 | A1 | 7/2008 | Kurokawa et al. | |
| 2008/0238663 | A1 | 10/2008 | Saito et al. | |
| 2010/0227670 | A1 | 9/2010 | Arezina et al. | |
| 2010/0261519 | A1 | 10/2010 | Zapata et al. | |
| 2010/0283683 | A1 | 11/2010 | Kurokawa | |

FOREIGN PATENT DOCUMENTS

| | | | |
|---|---|---|---|
| JP | 2002-288599 | A | 10/2002 |
| JP | 2004-205451 | A | 7/2004 |
| JP | 2005-276086 | A | 10/2005 |
| JP | 2005-339507 | A | 12/2005 |
| JP | 2006-345311 | A | 12/2006 |

* cited by examiner

CARD GAME MACHINE

BACKGROUND OF THE INVENTION

1. Field of the Invention

The present invention relates to a game machine. In particular, the present invention relates to a game machine using a card that has a semiconductor device capable of wireless communication.

2. Description of the Related Art

There are many kinds of card games. Typical examples are playing cards, karuta (Japanese playing cards), and the like. One type of card games is trading card games (also called collectible card games). As an example of techniques on a trading card that has a semiconductor device capable of wireless communication, Reference 1 is given (Reference 1: Japanese Published Patent Application No. H11-244537).

SUMMARY OF THE INVENTION

Trading cards are characterized by not only gameplay but also collection, and rare cards are sometimes traded at high prices among card enthusiasts. However, with the recent development of copy technology and the like, many clever imitations are produced, and security measures are needed.

In addition, existing trading cards each having a semiconductor device capable of wireless communication are recognized one by one; therefore, there is a limitation on the enhancement for gameplay.

In view of the above-mentioned problems, it is an object of the present invention to provide a card game machine which has high game expandability and which makes card forgery difficult.

One aspect of the present invention is a card game machine which can recognize the state of a card (type, location, orientation, a combination thereof, or the like) and in which the card has a semiconductor device (RF chip) capable of wireless communication. When a plurality of cards is used, the plurality of cards can be recognized at a time, which is preferable.

The card game machine of the present invention also has a game board, and the game board has a plurality of reader/writers (hereinafter may be referred to as R/Ws). Furthermore, each of the game board and the card has an RF chip. The RF chip preferably has an A/D converter circuit.

Note that, although there is no particular limitation on the shape of the card, it is preferable that the card have a quadrangular shape or a quadrangular shape with round corners. It is also preferable that the semiconductor device capable of wireless communication, which is mounted on the card, be positioned not in the center of the card but in a given fixed position on the left, right, top, or bottom. It is more preferable that the position be in any of the four corners of the card. In addition, when the card has a quadrangular shape with round corners, the card can be made easier to handle.

In the card game machine of the present invention, a plurality of reader/writers and RF chips are arranged in the game board; accordingly, not only data of the card but also signal intensity can be detected to identify the detailed position of am RF chip included in the card that is placed on the game board.

It is preferable that the position in which the RF chip is fixed be a given fixed position on the card because it is possible to recognize not only the position of the card but also the orientation of the card, whether the card is put face up or down, and the like.

As described above, from information stored in the RF chip and detailed information on the position of the RF chip on the game board, the type, location, orientation, or a combination thereof can be recognized, which allows gameplay to be enhanced. For example, when the rule is that a first parameter is used when the card is put face up and a second parameter is used when put face down, even if the first parameter of a card has a small value, the second parameter is used when the card is reversed. Accordingly, a card with a first parameter having a smaller value can defeat a card with a first parameter having a larger value, which makes the game more exciting.

By use of the game machine of the present invention, the game can be played following the rule even if the rule is complicated, and not only can the rule be unified, but also the burden of remembering the rule can be removed. Moreover, the adjustment of the difficulty level of the game and the change in the type of the game can also be achieved by change of software.

DETAILED DESCRIPTION OF THE INVENTION

Figure 1:
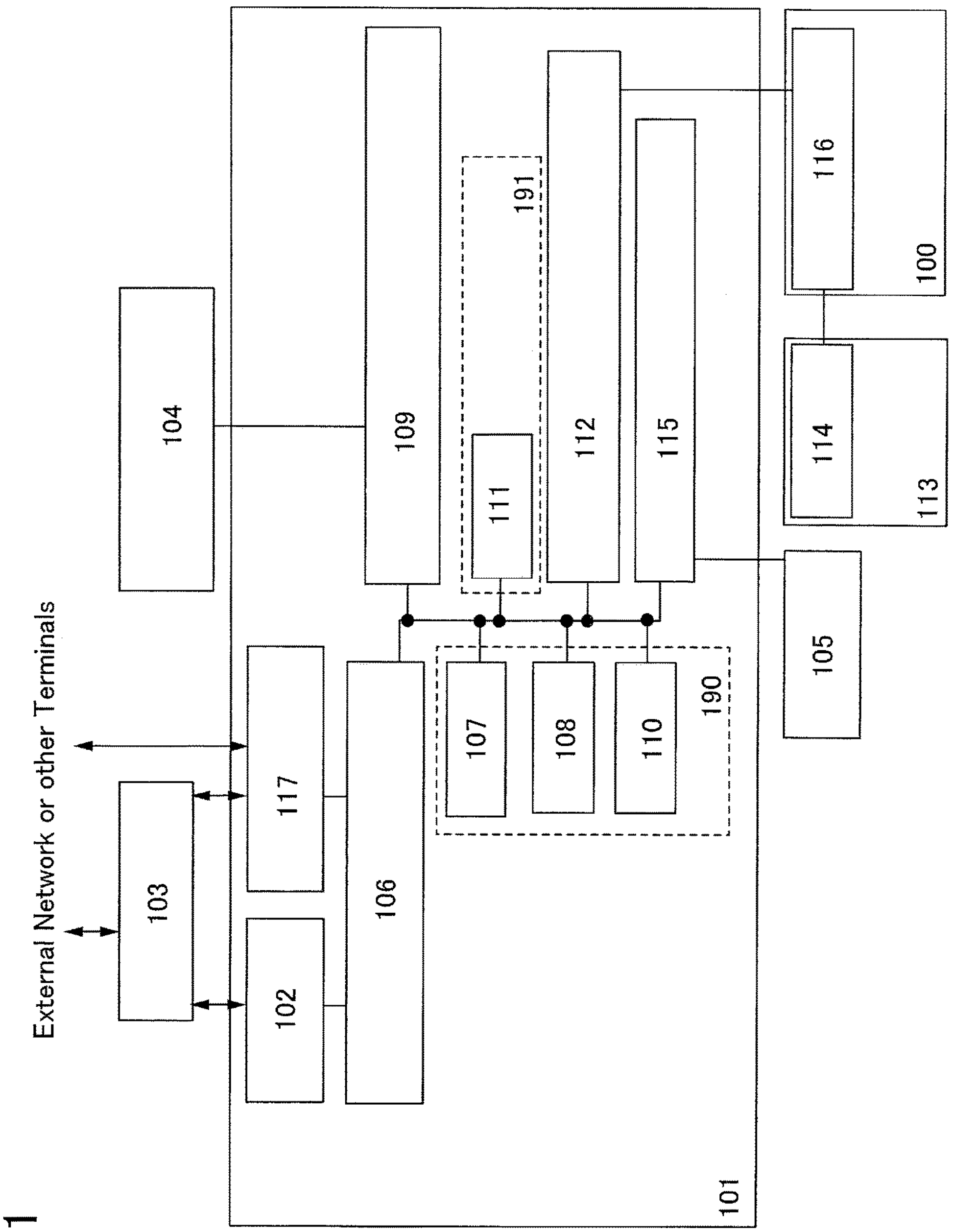
FIG. 1 is a diagram illustrating the present invention.

An embodiment mode of the present invention will be described with reference to the drawings. However, the present invention is not limited to the following description. This is because it is easily understood by those skilled in the art that the mode and detail of the present invention can be variously changed unless departing from the scope and spirit of the present invention. Therefore, the present invention will not be interpreted as being limited to the following description of the embodiment mode. Note that, in the description of modes of the present invention with reference to the drawings, the same components in different diagrams are commonly denoted by the same reference numeral.

FIG. 1 shows an example of a card game machine of the present invention. The card game machine of the present invention has a mat 100 with built-in R/Ws where a plurality of reader/writers 116 is arranged, a control device 101 which controls the mat 100 with built-in R/Ws, an external controller 104 which operates the control device 101, and a communication terminal 103. In addition, the card game machine preferably has a monitor 105. Although the plurality of reader/writers 116 does not necessarily need to be arranged in a matrix, it is preferable that they be provided in a matrix. Note that the mat 100 with built-in R/Ws is provided with a plurality of reader/writers and used as a game board, and may also be referred to as a pad with built-in R/Ws, a board with built-in R/Ws, a mat with mounted R/Ws, a pad with mounted R/Ws, a board with mounted R/Ws, or the like.

The control device 101 has an antenna 102 which communicates with the communication terminal 103, a wireless communication interface part 106, an external controller interface part 109, an R/W interface part 112, a memory section 190, and a control and arithmetic section 191. The memory section 190 has a RAM 107, a ROM 108, and an HD 110. The control and arithmetic section 191 has a CPU 111. When connected to the monitor 105, the control device 101 further has a monitor interface part 115. The control device 101 preferably has an infrared port 117.

A card 113 has an RF chip 114, and the RF chip 114 is configured to perform wireless communication with the control device 101 via any of the reader/writers 116 included in the mat 100 with built-in R/Ws. Note that the RF chip 114 corresponds to a semiconductor device capable of wireless communication and there is no particular limitation on the configuration thereof, and the like.

The CPU 111 is a central processing unit and it is acceptable as long as it has an arithmetic function and a control function.

The RAM (random access memory) 107 functions as, for example, a main memory device of the CPU 111. A main memory device refers to a memory device which can be directly accessed by the CPU and which is used for the operation of the CPU. As the RAM 107, a dynamic random access memory (DRAM), a static random access memory (SRAM), a ferroelectric random access memory (FeRAM), or the like can be used, but the present invention is not limited thereto. Depending on application and function, a suitable memory may be selected.

The ROM (read-only memory) 108 stores a serial number or the like which is unique to the control device 101. In addition, the ROM 108 may store a program to perform a necessary operation when the control device 101 is started. As the ROM 108, for example, a mask read-only memory (mask ROM), a programmable read-only memory (PROM), an electrically programmable read-only memory (EPROM), an electrically erasable programmable read-only memory (EEPROM), or the like can be used, but the present invention is not limited thereto.

The HD (hard disk) 110 is used to store a program and data necessary for the operation of the control device 101. However, the present invention is not limited thereto, and the program necessary for the operation of the control device 101 may be stored in another memory device. In addition, a memory device corresponding to the HD 110 may be detachable from the control device 101. That is, the HD 110 is not limited to a hard disk and may be another type of memory device.

It is acceptable as long as the wireless communication interface part 106 is configured to be able to transmit and receive a signal to and from the communication terminal 103 via the antenna 102.

It is acceptable as long as the communication terminal 103 is configured to be able to be connected to an external network. One example of the communication terminal 103 is a personal computer, but the present invention is not limited thereto. The connection of the communication terminal 103 to an external network allows software to be updated, which leads to achievement of installation of new software, updating of software, or the like. Installed software is stored in the HD 110. However, the present invention is not limited thereto, and installed software may be stored in the RAM 107 or the ROM 108. The RAM 107 requires a power supply to maintain the stored information; therefore, the RAM 107 is preferably used as a temporary buffer memory means when there is a difference between the communication speed of the communication terminal 103 and the access speed of the HD 110, for example.

The connection of the communication terminal 103 to an external network realizes a real-time play (called an online play) with another player at a distant place.

Note that the present invention is not limited thereto. For example, the control device 101 and the communication terminal 103 may perform wired communication. Alternatively, the control device 101 and the communication terminal 103 may perform communication without involving the antenna 102. An example of a method for communication between the control device and the communication terminal without involving the antenna is infrared communication. When infrared communication is performed, an infrared communication port may be provided in place of the antenna 102. In such a case, the wireless communication interface also needs to be modified in accordance with a communication method. Alternatively, the control device 101 may have both the antenna 102 and the infrared port 117.

Note that infrared rays are less likely to be diffracted than electric waves, and signals are unlikely to be spread spatially. Therefore, infrared communication is hard to be intercepted by another communication terminal. Therefore, infrared communication can prevent unauthorized access and is superior in terms of security.

Note that the communication terminal 103 is preferably a portable device (a cellular phone or a portable game machine). When the communication terminal 103 is a portable device, a game can be played at a variety of locations.

In addition, the communication terminal 103 may communicate with not only an external network but also another communication terminal located nearby. By communication with another communication terminal, when an opponent is close, a game can be played without involving a network. Note that the communication with another communication terminal may be performed using infrared rays. The infrared port for infrared communication is preferably incorporated in the control device 101. In this case, the control device 101 may use both the communication terminal 103 and the infrared port 117 which communicates with the communication terminal 103.

Note that it is preferable that the card game machine of the present invention has a configuration which allows the card game machine to perform infrared communication and a configuration which allows the card game machine to communicate with an external network. With both of these configurations, the above-mentioned merits can all be enjoyed.

Figure 2:
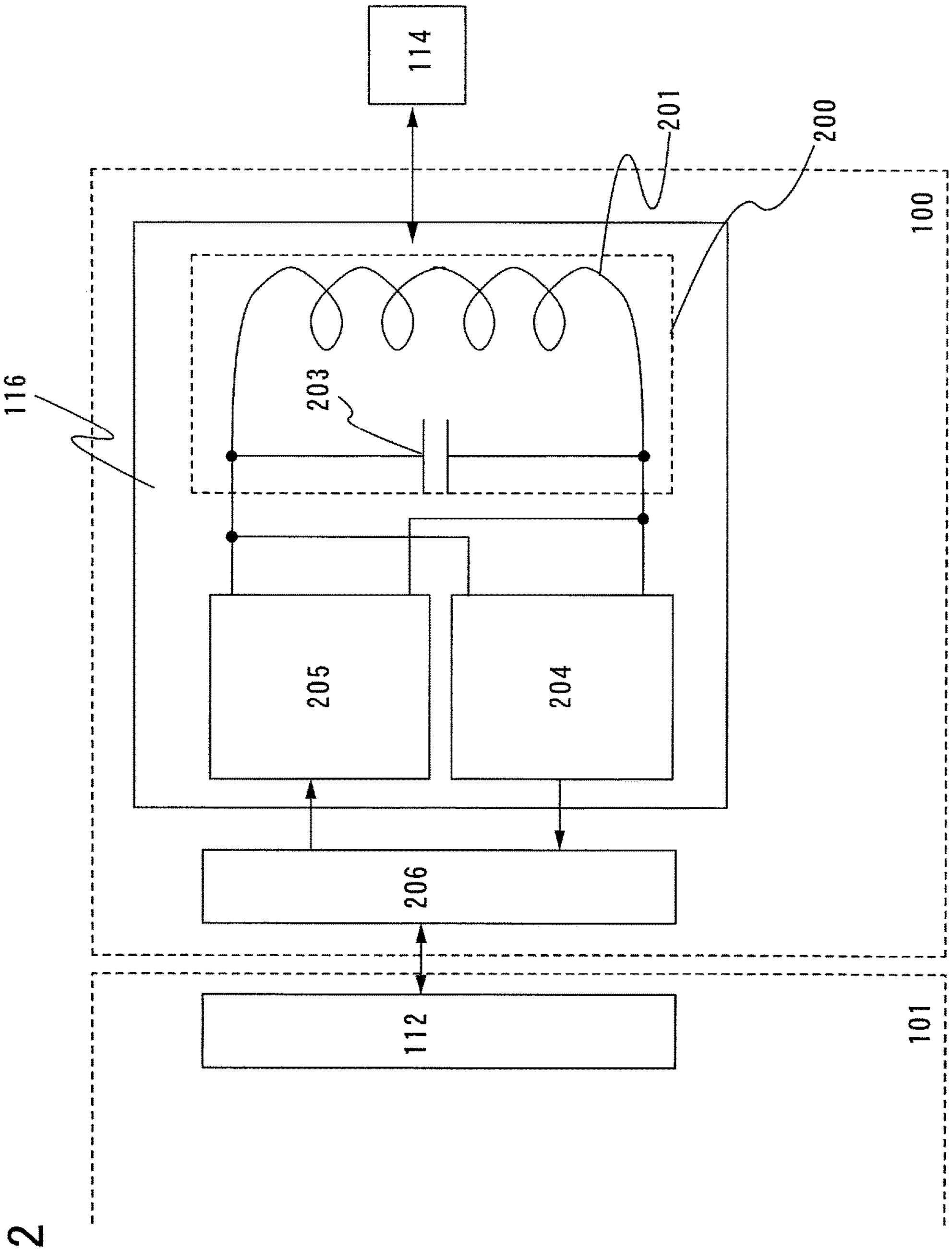
FIG. 2 is a diagram showing a reader/writer of the present invention.

The R/W interface part 112 may be configured to be able to process a signal, as needed, that is transmitted from an R/W control part 206 of each of the plurality of reader/writers and transmit the signal to the CPU 111 or the RAM 107 (see FIG. 2).

In the mat 100 with built-in R/Ws, a plurality of antennas is arranged in a matrix as a communication part. Signals received by the antennas are input to the R/W interface part 112 while a signal received by each antenna is distinguished from signals received by the other antennas.

One example of the reader/writer 116 is described with reference to FIG. 2. The reader/writer 116 in FIG. 2 has transmitting and receiving section including a receiving part 204 and a transmitting part 205, the R/W control part 206, and an antenna circuit 200. The antenna circuit 200 has an antenna 201 and a capacitor element 203 which functions as a resonant capacitor. The operation of the R/W control part 206 is controlled by the CPU 111 via the R/W interface part 112. The R/W control part 206 receives a data processing result from the receiving part 204 or transmits a data processing instruction to the transmitting part 205. The transmitting part 205 modulates a data processing instruction to be transmitted to the RF chip 114 and outputs the modified data processing instruction as an electromagnetic wave from the antenna circuit 200. In addition, the receiving part 204 demodulates a signal received by the antenna circuit 200 and outputs the demodulated signal to the R/W control part 206 as a data processing result. The R/W control part 206 has an interface part with the control device 101, which is connected to the R/W interface part 112 included in the control device 101.

Note that the reader/writer 116 shown in FIG. 2 is an example of the reader/writer of the present invention, and the present invention is not limited to the mode shown in FIG. 2. For example, the reader/writer 116 may have a plurality of antenna circuits, and the receiving part and the transmitting part may each be connected to a different antenna.

In addition, there is no particular limitation on modes in which the reader/writers 116 are arranged in a matrix in the mat 100 with built-in R/Ws. Here, FIGS. 3A to 3D each show an example in which the reader/writers 116 are arranged in four rows by four columns.

Figure 3A:
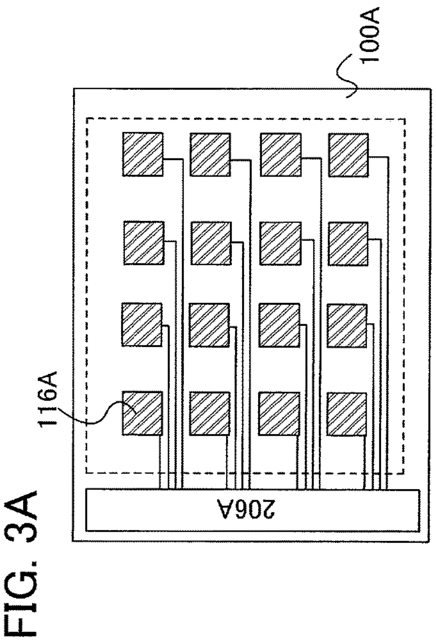
FIGS. 3A to 3D are diagrams each showing a mat with a built-in R/W of the present invention.

A mat 100A with built-in R/Ws shown in FIG. 3A has an R/W control part 206A. A plurality of reader/writers 116A is arranged in a matrix and electrically connected to the R/W control part 206A. Because the mat 100A with built-in R/Ws has a single control part, wirings for transmitting and receiving signals are all led out in one direction.

Figure 3B:
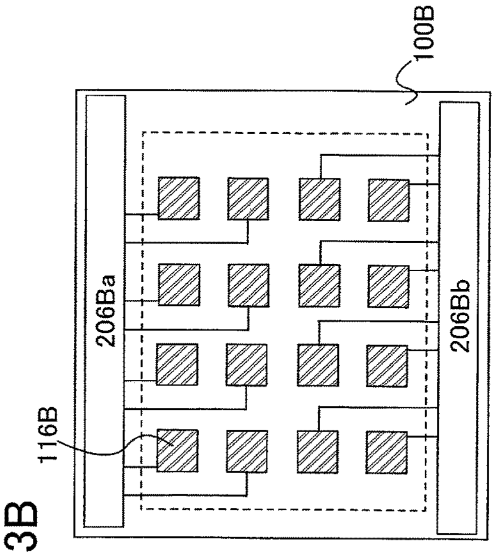
Figure 3C:
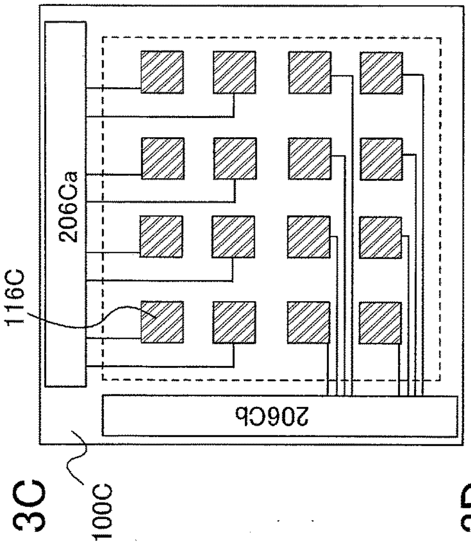

A mat 100B with built-in R/Ws shown in FIG. 3B has an R/W control part 206Ba and an R/W control part 206Bb. A plurality of reader/writers 116B is arranged in a matrix and electrically connected to the R/W control part 206Ba or the R/W control part 206Bb. Because the mat 100B with built-in R/Ws has two control parts in opposed positions, each wiring for transmitting and receiving a signal is led out to the control part at the closest position to each R/W. However, the R/W control parts do not necessarily need to be provided in opposed positions. As shown in FIG. 3C, a mat 100C with built-in R/Ws having a plurality of reader/writers 116C may have an R/W control part 206Ca and an R/W control part 206Cb, which may be arranged adjacently.

Note that "A and B are electrically connected to each other" here includes a case where A and B are electrically connected to each other (that is, a case where A and B are connected to each other with another element or another circuit interposed therebetween), a case where A and B are functionally connected to each other (that is, a case where A and B are functionally connected to each other with another circuit interposed therebetween), and a case where A and B are directly connected to each other (that is, a case where A and B are connected to each other without any other element or circuit interposed therebetween).

Figure 3D:
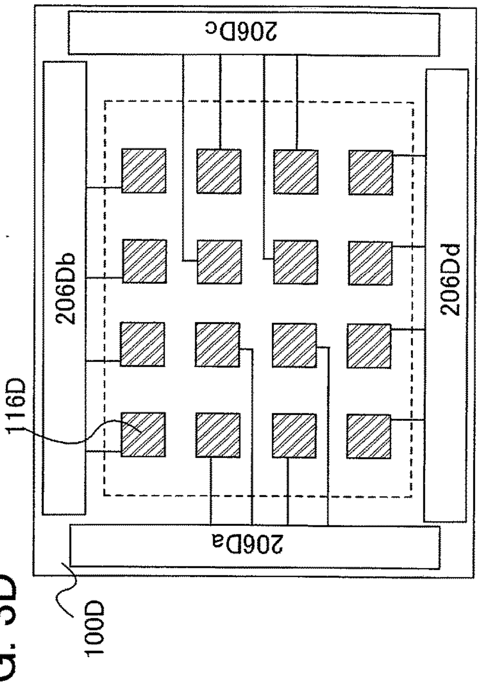

Alternatively, as shown in FIG. 3D, a mat 100D with built-in R/Ws may have a plurality of reader/writers 116D, which may be arranged in a matrix, and each wiring for transmitting and receiving a signal may be connected to the closest R/W control part of R/W control parts 206Da to 206Dd to each R/W.

Note that it is preferable that the mat 100 with built-in R/Ws be flexible. Being flexible makes the mat 100 with built-in R/Ws portable and makes it possible to play a game at a variety of locations. It is most preferable that the mat 100 with built-in R/Ws be flexible and the communication terminal 103 be a portable device (a cellular phone or a portable game machine).

In FIG. 1, the external controller 104 is connected to the control device 101 via the external controller interface part 109. The external controller interface part 109 processes a signal, which is input to the control device 101 from the external controller 104, as needed to be suitable for processing and transmits the processed signal to the CPU 111. The external controller 104 may be configured to perform wired or wireless communication with the control device 101 or may be provided in a chassis of the control device 101. There is no particular limitation on modes of the external controller 104, which may be any input device that allows a user to input information. For example, an audio microphone or the like may be used as the external controller 104. The external controller is not necessarily provided if not necessary.

The monitor 105 is connected to the control device 101 via the monitor interface part 115. The monitor interface part 115 processes a signal from the CPU 111 as needed and transmits the processed signal to the monitor 105. The monitor 105 displays information based on the signal from the CPU 111. The monitor 105 may be configured to perform wired or wireless communication with the control device 101 or may be incorporated in a chassis of the control device 101. There is no particular limitation on modes of the monitor 105 and may be any output device that allows a user to check information. For example, a speaker or a display device may be used as the monitor 105. The monitor 105 is not necessarily provided if not necessary.

Figure 4:
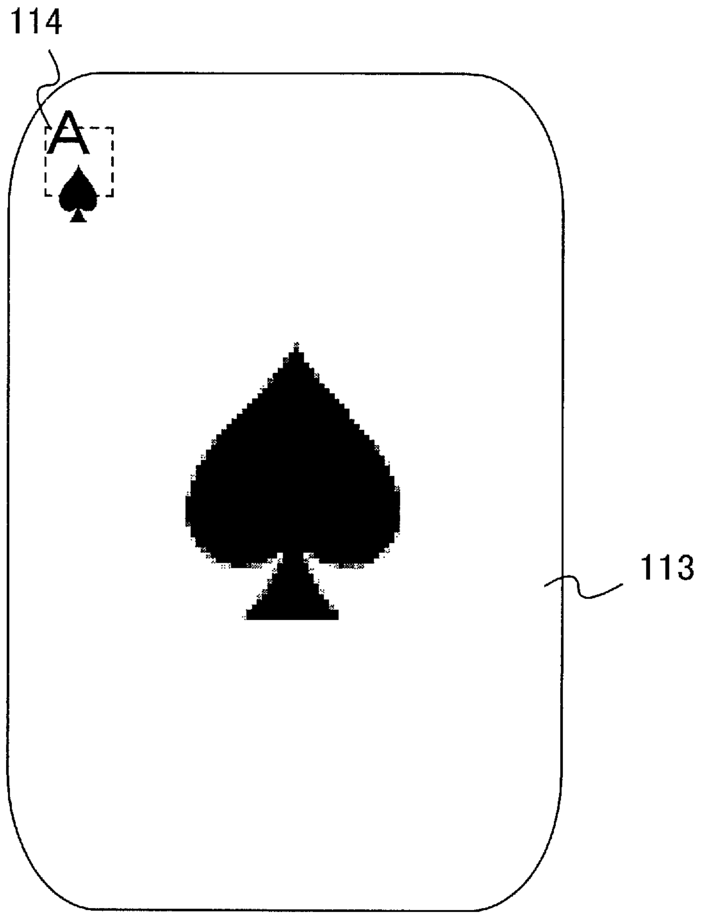
FIG. 4 is a diagram showing a card of the present invention.

Next, the card 113 having the RF chip 114 is described with reference to FIG. 4. FIG. 4 shows the case where a playing card is used as the card 113. It is preferable that the RF chip 114 be embedded in the card 113.

It is also preferable that the RF chip 114 be positioned off the center of the card 113. It is more preferable that the RF chip 114 be positioned in any one of four corners or in the vicinity thereof as shown in FIG. 4. From the strength of a signal received by the reader/writer 116, the position of the RF chip 114 in the card 113 can be read; thus, the state of the card such as the orientation of the card 113, whether the card 113 is put face up or down, or the like can be read.

Figure 5:
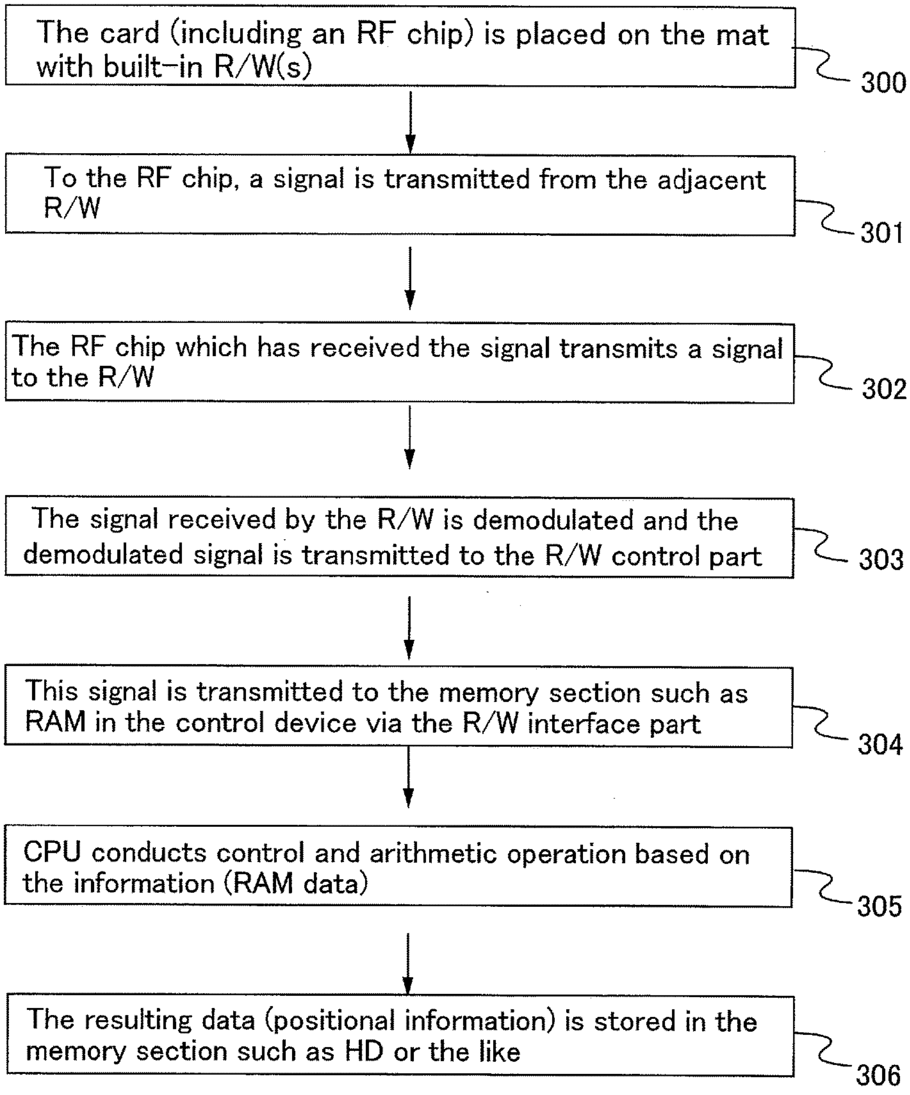
FIG. 5 is a diagram illustrating the present invention.

Next, the operation when the card 113 is placed in a given position on the mat 100 with built-in R/Ws is described with reference to FIG. 5. The mat 100 with built-in R/Ws is provided with a grid.

First, the card 113 is placed in a given cell on the mat 100 with built-in R/Ws (Step 300). Below the grid, it is preferable that each cell be provided with at least one reader/writer 116. To the RF chip 114, a signal is transmitted from the adjacent reader/writer 116 (Step 301). The RF chip 114 which has received the signal transmits a signal to the reader/writer 116 (Step 302). Here, the RF chip 114 may transmit a signal after processing the signal as needed. A signal received by the reader/writer 116 is demodulated by the receiving part 204 and the demodulated signal is transmitted to the R/W control part 206 (Step 303). This signal is transmitted to the RAM 107 in the control device 101 via the R/W interface part 112 (Step 304). When a signal is transmitted to the RAM 107, the information is temporarily stored in the RAM 107, and the CPU 111 conducts control and arithmetic operation based on the information (Step 305) to store positional information in the HD 110 (Step 306). Alternatively, a configuration may be employed in which a signal is transmitted to the CPU 111, and based on the signal, the CPU 111 conducts control and arithmetic operation.

Next, a preferred mode of the RF chip 114 of the present invention is described.

Figure 6:
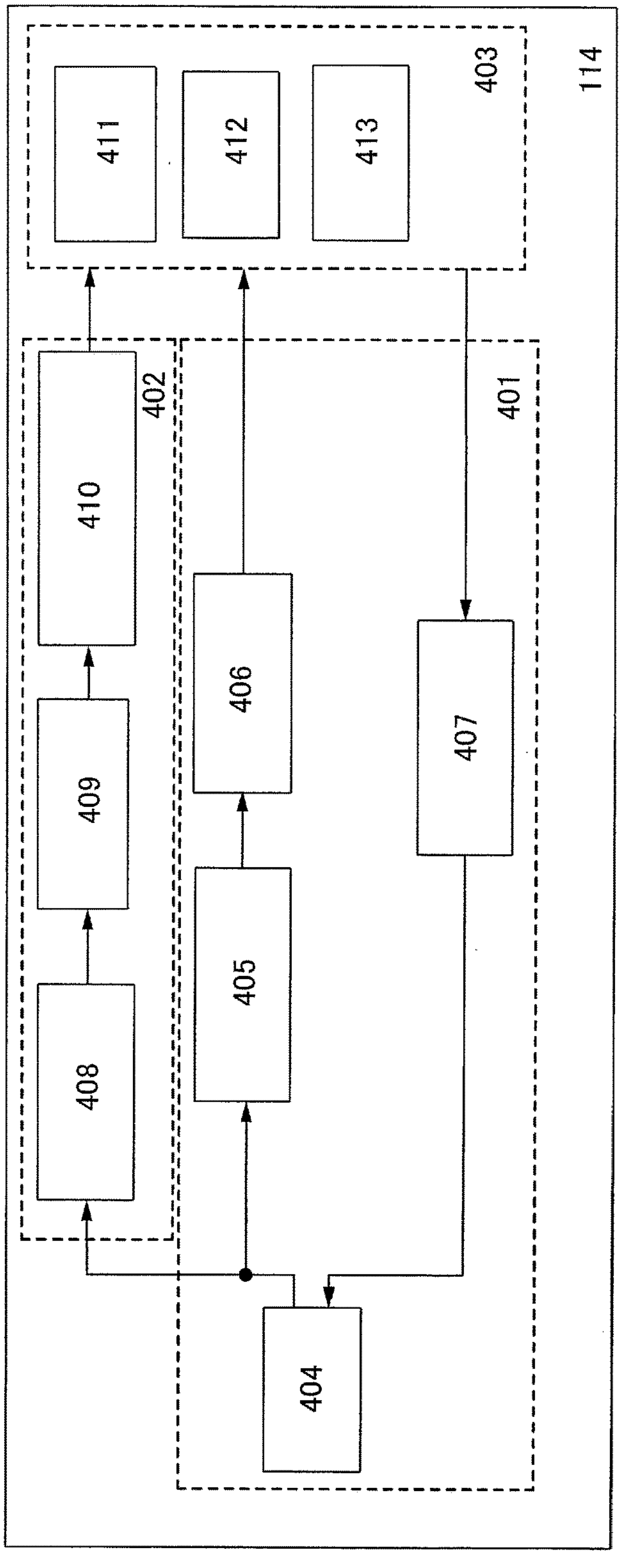
FIG. 6 is a diagram showing an RF chip of the present invention.

FIG. 6 shows a block diagram of the RF chip 114. As described above, the RF chip 114 transmits and receives data by use of wireless signals using the reader/writer 116.

The RF chip 114 in FIG. 6 has a signal transmitting and receiving section 401, a signal strength detection section 402, and a signal arithmetic section 403. The signal transmitting and receiving section 401 has an antenna 404, a rectifier circuit 405, a demodulation circuit 406, and a modulation circuit 407. The signal strength detection section 402 has a rectifier circuit 408, a power supply circuit 409, and an A/D converter circuit 410. The signal arithmetic section 403 has a CPU 411, a ROM 412, and a RAM 413. The signal arithmetic section 403 has a logic circuit such as the CPU 411, a nonvolatile memory as the ROM 412 which stores a program for the CPU 411 and is programmable, and a volatile memory as the RAM 413 used as a work field. For example, as the ROM 412, an EEPROM may be used, and as the RAM 413, an SRAM may be used.

Note that the signal strength detection section 402 in the RF chip 114 functions to detect the strength of a signal received by the RF chip 114. The signal arithmetic section 403 functions to calculate the distance between the reader/writer 116 and the RF chip 114 from the strength of the signal received by the RF chip 114. The signal transmitting and receiving section 401 functions to input the signal received by the RF chip 114 to the signal arithmetic section 403, read identification information of the RF chip 114 from a memory circuit such as the ROM 412 or the RAM 413 of the signal arithmetic section 403, and transmit the identification information to the reader/writer 116 and also functions to transmit information about the distance between the reader/writer 116 and the RF chip 114, which is calculated by the signal arithmetic section 403, to the reader/writer 116.

In the signal transmitting and receiving section 401 in FIG. 6, a signal received by the antenna 404 is input to the rectifier circuit 405. An output signal from the rectifier circuit 405 is input to the demodulation circuit 406. An output signal from the demodulation circuit 406 is input to the signal arithmetic section 403, and information of the RF chip 114 is output to the modulation circuit 407. Then, an output signal from the modulation circuit 407 is output to the antenna and then output to a reader/writer outside the RF chip.

In the signal strength detection section 402 in FIG. 6, a signal received by the antenna 404 of the signal transmitting and receiving section 401 is input to the rectifier circuit 408. An output signal from the rectifier circuit 408 is input to the power supply circuit 409. An output from the power supply circuit 409 is input to the A/D converter circuit 410. An output from the power supply circuit 409 is also supplied as electric power to each circuit of the RF chip 114. The A/D converter circuit 410 converts a signal having analog values, which is output from the power supply circuit 409, into a signal having digital values and outputs the signal having digital values to the signal arithmetic section 403.

In the signal arithmetic section 403 in FIG. 6, the distance between the reader/writer 116 and the RF chip 114 is calculated from the signal having digital values which is output from the A/D converter circuit 410 in the signal strength detection section 402. The calculation of the distance between the reader/writer 116 and the RF chip 114 in the signal arithmetic section 403 is preferably performed by processing by software. For a method for processing by software, an arithmetic circuit is formed using the CPU 411, the ROM 412, and the RAM 413, and the CPU 411 executes a distance calculation program. By the processing by software, a distance calculation method can be modified by modification of a program, and the area in the RF chip 114 occupied by hardware can be decreased. It is needless to say that the distance may be calculated by hardware or the calculation of distance may be performed by both hardware and software. Note that data on the calculated distance are output to the reader/writer 116 via the modulation circuit 407 and the antenna 404 in the signal transmitting and receiving section 401.

Note that an RF chip which can be used for the present invention is not limited to this. The A/D converter circuit or the like may be mounted on the reader/writer.

Note that it is preferable that the ROM 412 store identification information which is unique to each RF chip (for example, a serial number of the card). When each RF chip is made to have identification information that is unique thereto, illegal forgery of the card can be prevented.

Figure 7:
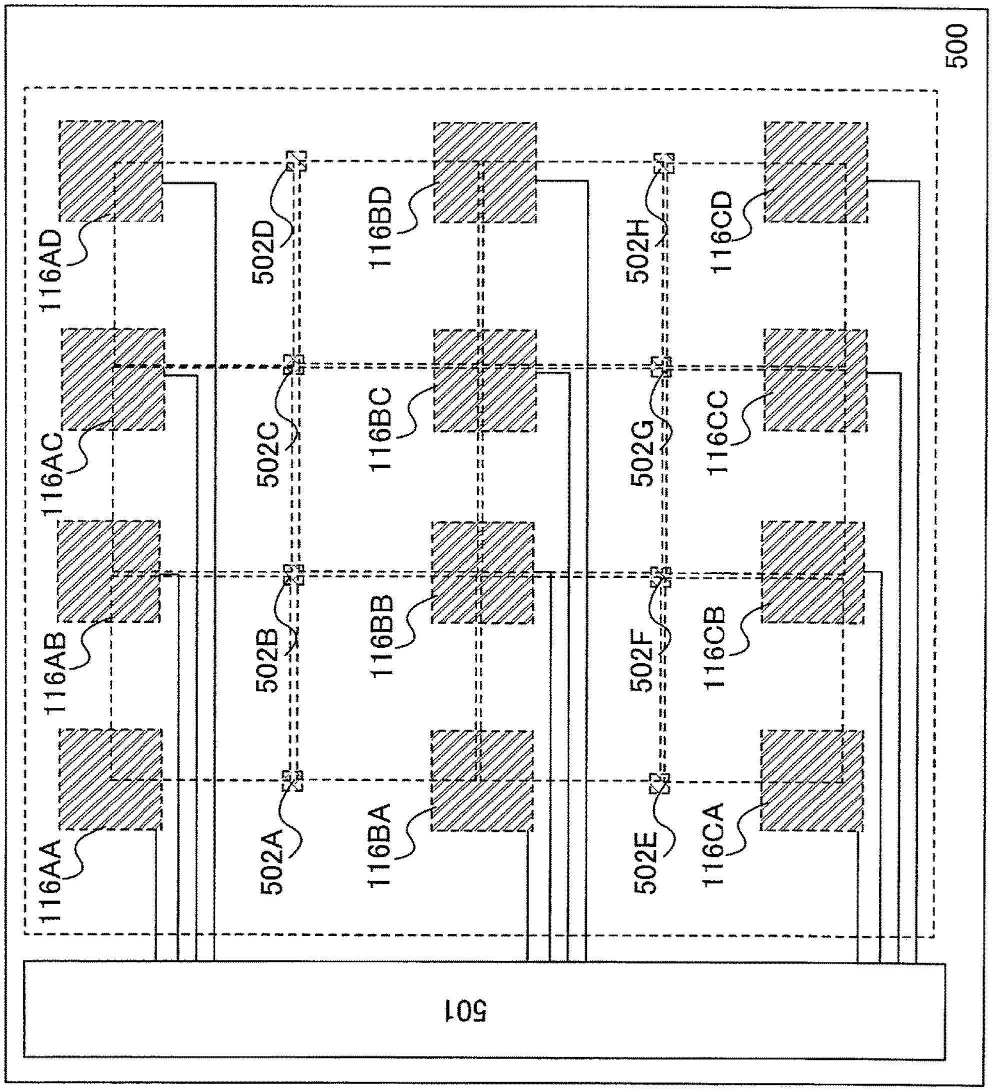
FIG. 7 is a diagram showing an example of a mat with a built-in R/W of the present invention.

Next, the detection of positional information using the RF chip of the present invention is described with reference to FIGS. 7 to 9. FIG. 7 shows a mat 500 with built-in R/Ws that has an R/W control part 501, reader/writers 116AA to 116CD, and RF chips 502A to 502H.

Figure 8:
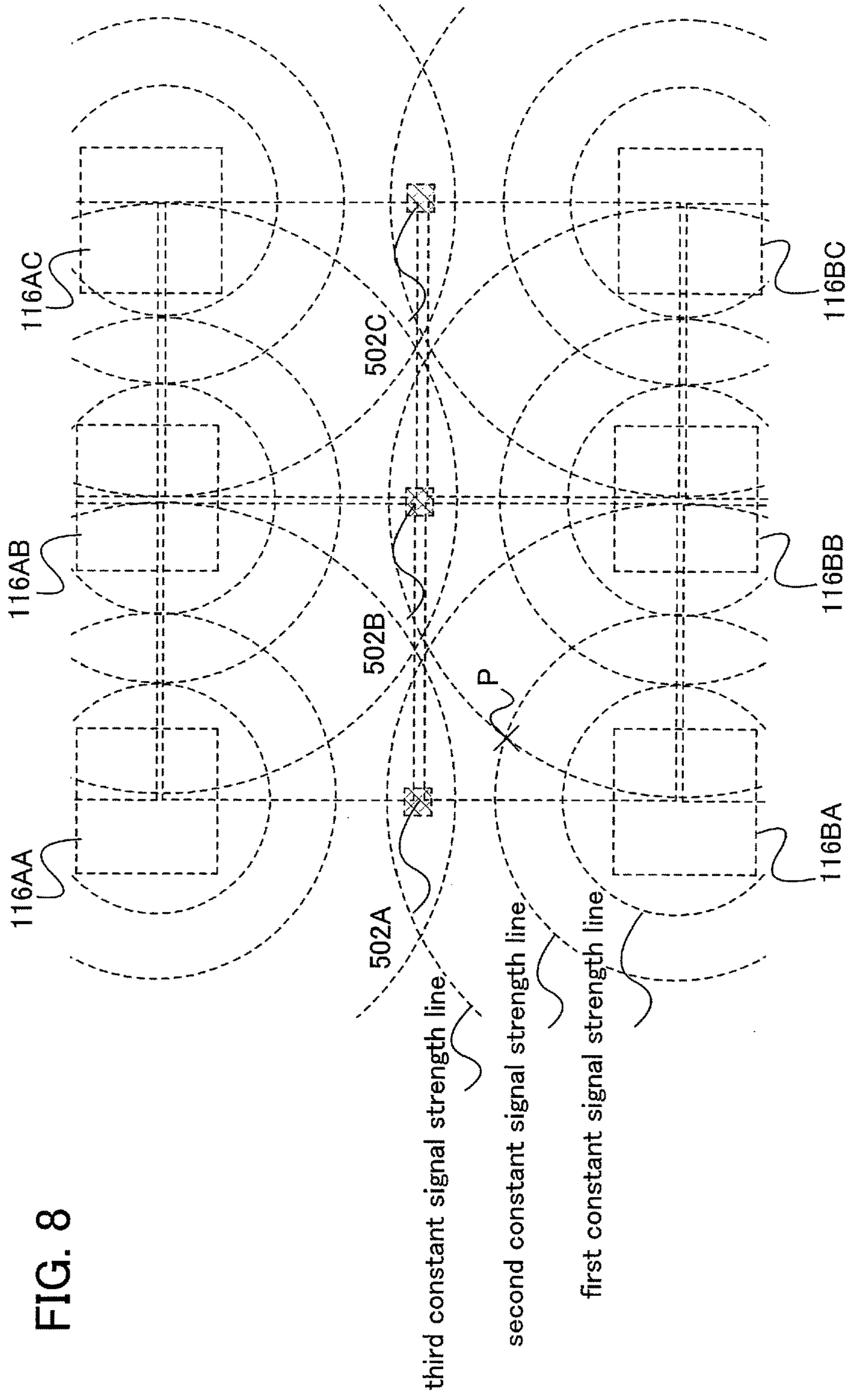
FIG. 8 is a diagram showing the intensity distribution of an electric wave from a mat with a built-in R/W of the present invention.

FIG. 8 is a diagram showing points at first to third signal strengths, which are connected by dotted lines, of wireless signals transmitted from the reader/writers 116AA to 116BC. The case where the RF chip 114 is located at, for example, a detection point P is considered. The point P is on a second constant signal strength line of the reader/writer 116BA and on a third constant signal strength line of the reader/writer 116BB.

Figure 9:
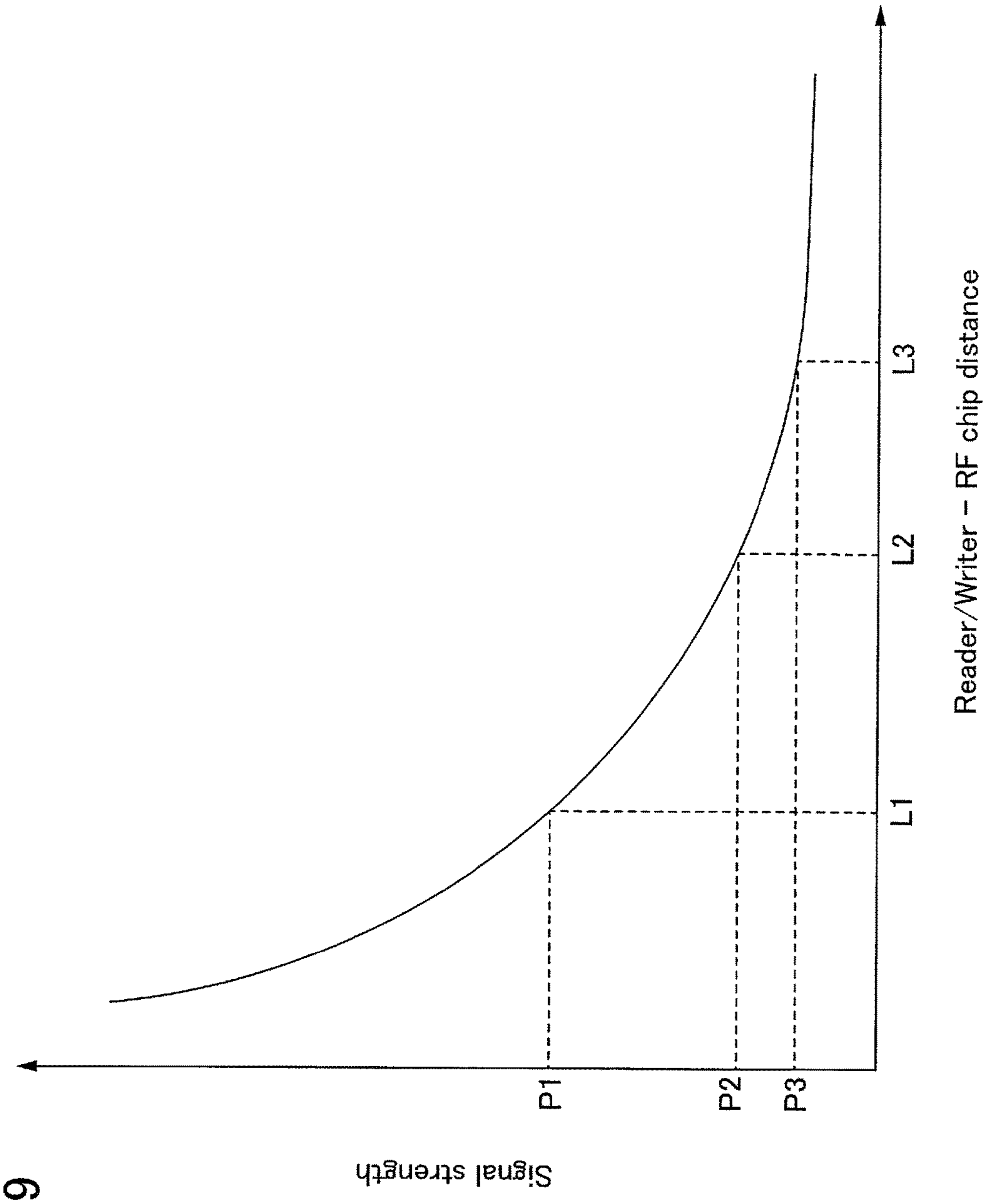
FIG. 9 is a diagram showing a relationship between the distance and the signal intensity of a wireless signal.

FIG. 9 is a diagram showing the relationship between the distance from a reader/writer to an RF chip and the signal strength of a wireless signal transmitted from the reader/writer in an ideal environment (in an environment where there are no obstructions and reflectors). In FIG. 9, as the distance increases, the signal strength decreases. That is, if the distance is determined, the signal strength can be specified uniquely. In addition, if the signal strength is determined, the distance can be specified uniquely.

Note that, in FIG. 9, signal strength at a first constant signal strength line is denoted by P1; signal strength at a second constant signal strength line, P2; and signal strength at a third constant signal strength line, P3. The distance between a reader/writer and the first constant signal strength line of the reader/writer is denoted by L1; the distance between the reader/writer and the second constant signal strength line, L2; and the distance between the reader/writer and the third constant signal strength line, L3.

Note that each of the RF chips 502A to 502C functions to detect the signal strength of a wireless signal and calculate a distance from the detected signal strength by use of the relationship between the distance and the signal strength shown in FIG. 9. Because the distances between the reader/writers 116AA to 116BC and the RF chips 502A to 502C are set to be constant, the position of the RF chip 114 can be calculated from the relationship between the distances between the reader/writers 116AA to 116BC and the RF chips 502A to 502C and the signal strengths. That is, because the distance between a reader/writer and an RF chip mounted on a mat with built-in R/Ws is known, this can be used as a reference to calculate the position of the RF chip 114 mounted on the card 113.

Note that either the RF chip or the reader/writer may function to calculate a distance from signal strength. When the reader/writer functions to calculate a distance from signal strength, the RF chip may function to detect signal strength and transmit the detected signal strength to the reader/writer as transmission data. It is preferable that the reader/writer function to calculate a distance from signal strength because the size and the amount of power consumption of the RF chip can be reduced.

Either the reader/writer or the CPU 111 of the control device 101 may function to specify a position from the calculated distance. It is preferable that the CPU 111 function to specify a position from the calculated distance because the size and the amount of power consumption of the reader/writer can be reduced.

Although the case where a wireless signal transmitted from the reader/writer is detected by the RF chip is described, a configuration may be employed in which a wireless signal transmitted from the RF chip is detected by the reader/writer. Note that, when a configuration is employed in which the RF chip transmits a wireless signal and the reader/writer detects the wireless signal, the RF chip may be provided with a storage cell. It is preferable that the RF chip be provided with a storage cell because the communication range can be extended. When a configuration is employed in which the RF chip has a storage cell, the storage cell may be a secondary battery or the like that can be recharged. By use of a secondary battery as the storage cell, the RF chip can be used without any need to replace the battery that is the storage cell, and the position thereof can be specified.

Figures 10A, 10B, 10C:
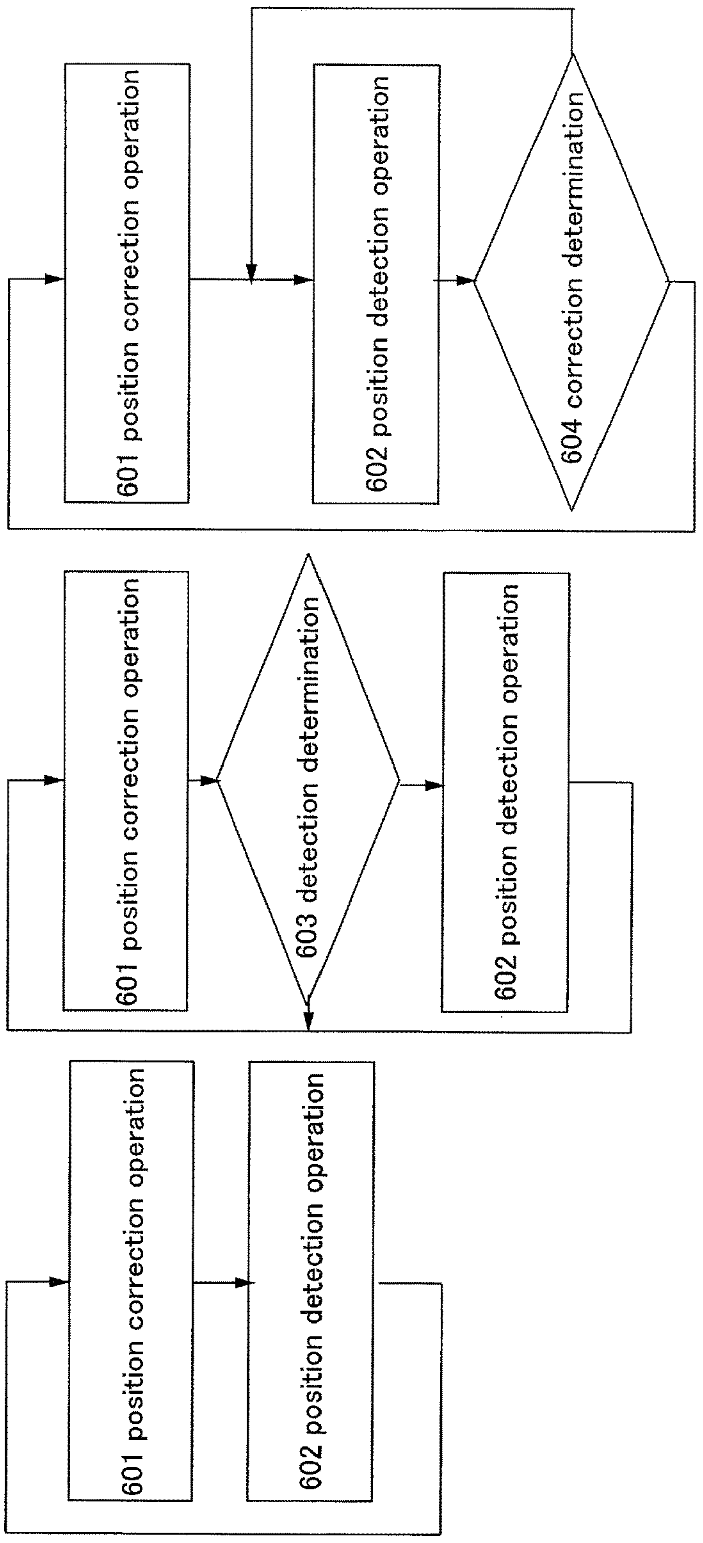
FIGS. 10A to 10C are diagrams each showing a flowchart of a positional information detection system using an RF chip of the present invention.
Figure 11B:
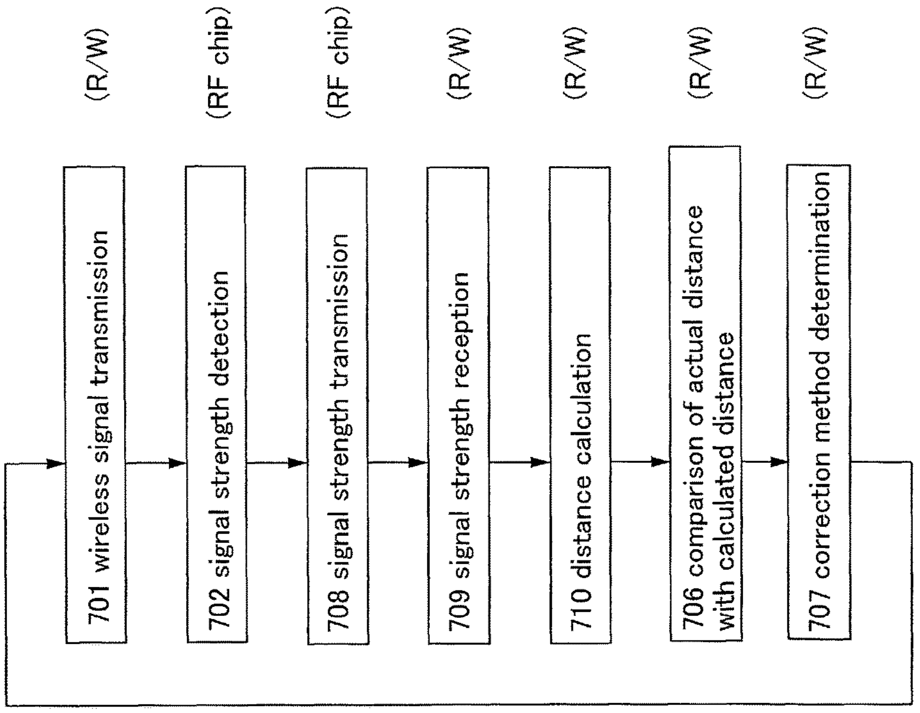
FIGS. 11A and 11B are diagrams each showing a flowchart of position correction operation of a positional information detection system using an RF chip of the present invention.
Figure 11A:
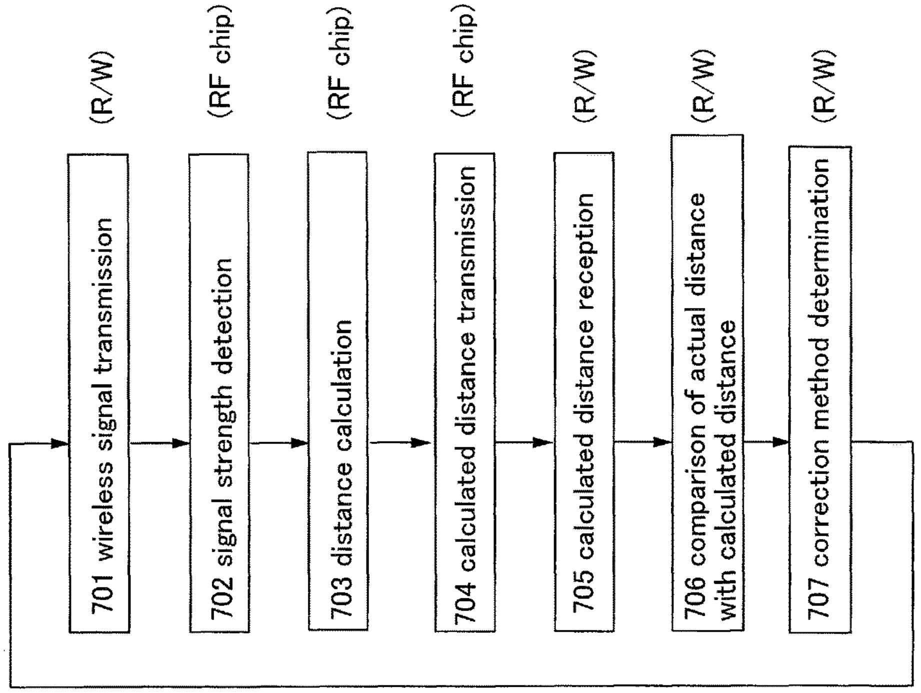
Figure 12B:
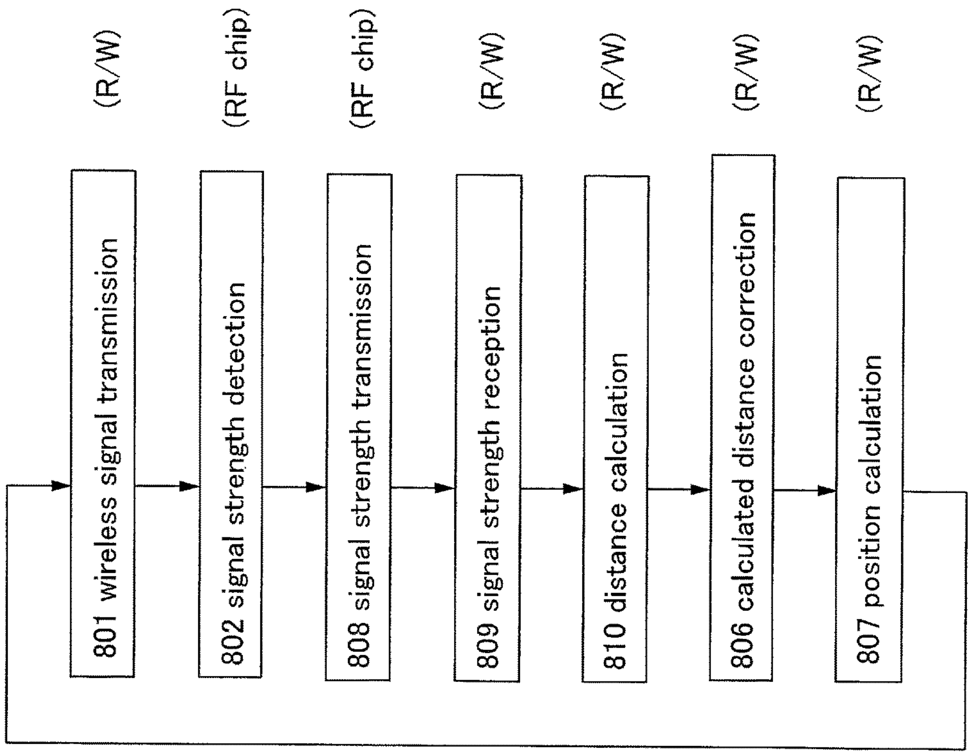
FIGS. 12A and 12B are diagrams each showing a flowchart of position detection operation of a positional information detection system using an RF chip of the present invention.
Figure 12A:
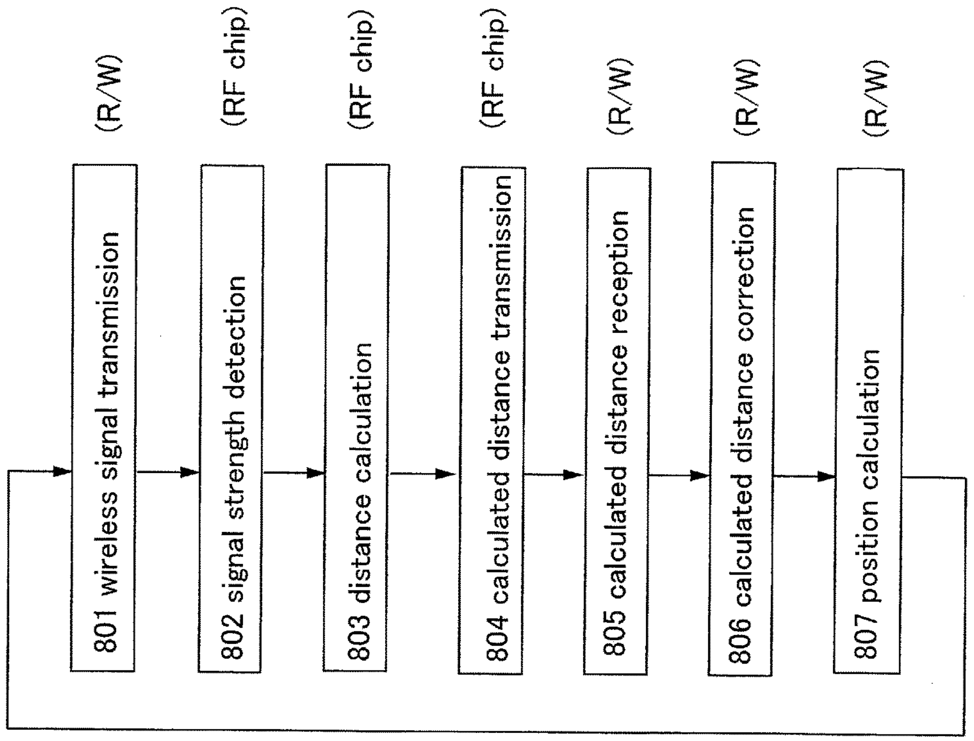

Next, flowcharts of positional information detection using the RF chip of the present invention are described with reference to FIGS. 10A to 12B. FIGS. 10A to 10C are flowcharts of a positional information detection system using the RF chip of the present invention. FIGS. 11A and 11B are flowcharts of a position correction operation 601 of the positional information detection system using the RF chip of the present invention. FIGS. 12A and 12B are flowcharts of a position detection operation 602 of the positional information detection system using the RF chip of the present invention.

FIG. 10A is a first flowchart of the positional information detection system. In a method shown in FIG. 10A, the position correction operation 601 and the position detection operation 602 are repeated. In this method, the position correction operation 601 is performed only before the position detection operation; thus, there is no need to perform the position correction operation 601 unnecessarily.

FIG. 10B is a second flowchart of the positional information detection system. In a method shown in FIG. 10B, a first determination (detection determination) 603 is performed after the position correction operation 601. By the first determination (detection determination) 603, it is determined whether the process proceeds to the position detection operation 602 or the position correction operation 601 is repeated. In addition, it is preferable that the first determination (detection determination) 603 be performed by a reader/writer or a server (such as a control device) which manages a reader/writer.

FIG. 10C is a third flowchart of the positional information detection system. In a method shown in FIG. 10C, a second determination (correction determination) 604 is performed after the position detection operation 602. Note that, by the second determination (correction determination) 604, it is determined whether the process proceeds to the position correction operation 601 or the position detection operation 602 is repeated. In addition, the second determination (correction determination) 604 is performed by a reader/writer or a server (such as a control device) which manages a reader/writer. This method is suitable for the case where the detection of positional information on an object is performed frequently.

FIG. 11A is a first flowchart of the position correction operation 601. This flowchart is a flowchart in the case where the RF chip functions to calculate a distance from signal strength and the reader/writer functions to calculate a position from the calculated distance.

First, the reader/writer transmits a wireless signal (wireless signal transmission 701), and the RF chip receives the wireless signal and detects its signal strength (signal strength detection 702). Next, the RF chip calculates a distance from the signal strength (distance calculation 703) and transmits the calculated distance to the reader/writer as transmission data (calculated distance transmission 704). The reader/writer receives the calculated distance (calculated distance reception 705) and compares the calculated distance with the distance between the reader/writer and an RF chip whose positional information is known (comparison of actual distance with calculated distance 706). In addition, the reader/writer determines a method for correcting the calculated distance based on the result of comparison (correction method determination 707).

Note that, in this method, although the case where the reader/writer functions to correct the calculated distance is described, a configuration may be employed in which a separately provided server functions to correct the calculated distance. In addition, although the case where the RF chip detects the wireless signal which is transmitted from the reader/writer is described, a configuration can also be employed in which the reader/writer detects a wireless signal which is transmitted from the RF chip.

FIG. 11B is a second flowchart of the position correction operation. This flowchart is a flowchart in the case where the reader/writer functions to calculate a distance from signal strength and calculate a position from the calculated distance.

First, the reader/writer transmits a wireless signal (wireless signal transmission 701), and the RF chip receives the wireless signal and detects signal strength (signal strength detection 702). The RF chip transmits the signal strength to the reader/writer as transmission data (signal strength transmission 708). The reader/writer receives the signal strength (signal strength reception 709) and calculates a distance from the signal strength (distance calculation 710). The reader/writer compares the calculated distance with the distance between the reader/writer and an RF chip whose positional information is known (comparison of actual distance with calculated distance 706). In addition, the reader/ writer determines a method for correcting the calculated distance based on the result of comparison (correction method determination 707).

Note that, in this method, although the case where the reader/writer functions to correct the calculated distance is described, a configuration may be employed in which a separately provided server functions to correct the calculated distance. In addition, although the case where the RF chip detects the wireless signal which is transmitted from the reader/writer is described, a configuration can also be employed in which the reader/writer detects a wireless signal which is transmitted from the RF chip. The configuration in which a separately provided server functions to correct the calculated distance is preferable because the size and the amount of power consumption of the reader/writer can be reduced.

FIG. 12A is a first flowchart of the position detection operation 602. This flowchart is a flowchart in the case where the RF chip functions to calculate a distance from signal strength and the reader/writer functions to calculate a position from the calculated distance.

First, the reader/writer transmits a wireless signal (wireless signal transmission 801), and the RF chip receives the wireless signal and detects signal strength (signal strength detection 802). Next, the RF chip calculates a distance from the signal strength (distance calculation 803) and transmits the calculated distance to the reader/writer as transmission data (calculated distance transmission 804). The reader/writer receives the calculated distance (calculated distance reception. 805) and corrects the calculated distance by a correction method which is determined by the position correction operation (calculated distance correction 806). In addition, the reader/writer calculates the position of an object from the corrected calculated distance (position calculation 807).

Note that, in this method, although the case where the reader/writer functions to correct the calculated distance and calculate the position is described, a configuration may be employed in which a separately provided server functions to correct the calculated distance. The configuration in which a separately provided server functions to correct the calculated distance and calculate the position is preferable because the size and the amount of power consumption of the reader/writer can be reduced.

In addition, although the case where the RF chip detects the wireless signal which is transmitted from the reader/writer is described, a configuration can also be employed in which the reader/writer detects a wireless signal which is transmitted from the RF chip. In the case where a configuration is employed in which the RF chip transmits a wireless signal and the reader/writer detects the wireless signal, a configuration may be employed in which the RF chip is provided with a storage cell. The configuration in which the RF chip is provided with a storage cell is preferable because the communication range can be extended. In the configuration in which the RF chip has a storage cell, the storage cell may be a rechargeable storage cell (secondary battery). The use of a secondary battery as the storage cell is preferable because the positional information detection system can be used without any need to replace the battery that is the storage cell.

FIG. 12B is a second flowchart of the position detection operation 602. This flowchart is a flowchart in the case where the reader/writer functions to calculate a distance from signal strength and calculate a position from the calculated distance.

First, the reader/writer transmits a wireless signal (wireless signal transmission 801), and the RF chip receives the wireless signal and detects signal strength (signal strength detection 802). Next, the RF chip transmits the signal strength to the reader/writer as transmission data (signal strength transmission 808). The reader/writer receives the signal strength (signal strength reception 809) and calculates a distance from the signal strength (distance calculation 810). The reader/writer corrects the calculated distance by a correction method which is determined by the position correction operation (calculated distance correction 806). In addition, the reader/writer calculates the position of an object from the corrected calculated distance (position calculation 807).

Note that, in this method, although the case where the reader/writer functions to correct the calculated distance and calculate the position is described, the CPU 111 included in the control device 101 may function as described above. It is preferable that the CPU 111 function as described above because the size and the amount of power consumption of the reader/writer can be reduced.

Although the case where the RF chip detects the wireless signal which is transmitted from the reader/writer is described, a configuration may be employed in which the reader/writer detects a wireless signal which is transmitted from the RF chip. In the configuration in which the RF chip transmits a wireless signal and the reader/writer detects the wireless signal, a configuration may be employed in which the RF chip is provided with a storage cell. The configuration in which the RF chip is provided with a storage cell is preferable because the communication range can be extended. In the configuration in which the RF chip has a storage cell, the storage cell may be a rechargeable storage cell (secondary battery). The use of a secondary battery as the storage cell is preferable because the detection of positional information can be performed without any need to replace the battery that is the storage cell.

Note that, as described above, the detailed position of the RF chip can be specified based on the distance between the RF chip and the plurality of reader/writers. From the specified detailed positional information on the RF chip, information about the orientation of the card 113, information about whether the card 113 is put face up or down, or the like is obtained, and such information is stored in the HD 110. With the use of the game machine of the present invention, detailed results of plays with a specific opponent can also be recorded. However, the present invention is not limited thereto, and a mode may be employed in which the RF chip included in the card is provided with a memory section and such results of plays as described above are stored in the memory section.

With the use of the card game machine of the present invention as described above, a card game which can be played with an opponent in front or an opponent at a distant place can be realized. The card game machine of the present invention differs from existing ones in that it reads the data, position, and the like of a plurality of cards at a time with a plurality of reader/writers, which allows gameplay to be enhanced compared to existing card game machines which read cards one by one.

This application is based on Japanese Patent Application serial no. 2007-142370 filed with Japan Patent Office on May 29, 2007, the entire contents of which are hereby incorporated by reference.

What is claimed is:

1. A card game machine comprising:

a mat including a plurality of first RF chips and a plurality of reader/writers arranged in an (M, N) matrix including M rows and N columns;

a control device; and a communication terminal configured to communicate with the control device via an antenna included in the control device, wherein the plurality of reader/writers are configured to be wirelessly connected to a second RF chip included in a first card and a third RF chip included in a second card, wherein the control device is configured to perform wireless communication with the second and third RF chips via any of the plurality of reader/writers, wherein one of the plurality of first RF chips is positioned at a center between one of the plurality of reader/writers at (p, q) (p is greater than or equal to 1 and less than or equal to M−1 and q is greater than or equal to 1 and less than or equal to N) and another one of the plurality of reader/writers at (p+1, q), wherein the plurality of first RF chips are configured to transmit and receive data by use of a wireless signal using the plurality of reader/writers from the second RF chip and the third RF chip and detect a signal strength of the wireless signal, wherein the control device is configured to determine a type, an orientation and a position of each of the first card and the second card from the detected signal strength at the same time, wherein the control device is connected to the plurality of reader/writers, wherein the communication terminal is connected to an external network, and wherein the first card and the second card are used for a card game of the card game machine.

2. The card game machine according to claim 1, wherein the control device is configured to determine whether each of the first card and the second card is put face up or down.

3. The card game machine according to claim 1, wherein the control device is connected to an input device and an output device.

4. The card game machine according to claim 3, wherein the output device is a display device.

5. The card game machine according to claim 1, wherein each of the first card and the second card has a quadrangular shape or a quadrangular shape with round corners, and each of the second RF chip and the third RF chip is provided near any one of four corners of each of the first card and the second card, respectively.

6. The card game machine according to claim 1, wherein the first card and the second card are placed on the mat.

7. The card game machine according to claim 1, wherein the mat with the plurality of reader/writers is flexible.

8. The card game machine according to claim 1, wherein distances between a row of the plurality of reader/writers and a row of the plurality of first RF chips of the mat are set to be constant.

9. A card game machine comprising:

a mat including a plurality of first RF chips and a plurality of reader/writers arranged in an (M, N) matrix including M rows and N columns; and a control device, wherein the plurality of reader/writers are configured to be wirelessly connected to a second RF chip included in a first card and a third RF chip included in a second card, wherein the control device is configured to perform wireless communication with the second and third RF chips via any of the plurality of reader/writers, wherein one of the plurality of first RF chips is positioned at a center between one of the plurality of reader/writers at (p, q) (p is greater than or equal to 1 and less than or equal to M−1 and q is greater than or equal to 1 and less than or equal to N) and another one of the plurality of reader/writers at (p+1, q), wherein the plurality of first RF chips are configured to transmit and receive data by use of a wireless signal using the plurality of reader/writers from the second RF chip and the third RF chip and detect a signal strength of the wireless signal, wherein the control device is configured to determine a type, an orientation and a position of each of the first card and the second card from the detected signal strength at the same time, wherein the control device is connected to the plurality of reader/writers, and wherein the first card and the second card are used for a card game of the card game machine.

10. The card game machine according to claim 9, wherein the control device is configured to determine whether each of the first card and the second card is put face up or down.

11. The card game machine according to claim 9, wherein the control device is connected to an input device and an output device.

12. The card game machine according to claim 11, wherein the output device is a display device.

13. The card game machine according to claim 9, further comprising:

an infrared port in the control device; and a communication terminal configured to perform communication via the infrared port, wherein the communication terminal is configured to communicate with another communication terminal.

14. The card game machine according to claim 9, wherein each of the first card and the second card has a quadrangular shape or a quadrangular shape with round corners, and each of the second RF chip and the third RF chip is provided near any one of four corners of each of the first card and the second card, respectively.

15. The card game machine according to claim 9, wherein the first card and the second card are placed on the mat.

16. The card game machine according to claim 9, wherein the mat with the plurality of reader/writers is flexible.

17. The card game machine according to claim 9, wherein distances between a row of the plurality of reader/writers and a row of the plurality of first RF chips of the mat are set to be constant.

* * * * *